United States Patent Office 3,144,488
Patented Aug. 11, 1964

3,144,488
PROCESS FOR THE PRODUCTION OF 3-CHLORO-BUTANONE-2 AND BUTANONE
Jürgen Smidt, Munich-Solln, Rudolf Rüttinger, Diesenhofen, near Munich, Hugo Kojer, Munich, and Rolf Sieber, Munich-Forstenried, Germany, assignors to Consortium für Elektrochemische Industrie G.m.b.H., Munich, Germany
No Drawing. Filed June 22, 1960, Ser. No. 37,855
Claims priority, application Germany June 29, 1959
4 Claims. (Cl. 260—597)

The present invention relates to a process for the production of 3-chlorobutanone-2 in addition to butanone by oxidation of n-butylenes using aqueous catalytic solutions containing palladium chloride and copper chloride.

It is known that butanone can be produced in high yields with aqueous catalytic solutions containing palladium chloride and copper chloride.

It has now been found that chlorobutanones are produced in small amounts as a by-product in this process. Such chlorobutanone product contains up to 90% of 3-chlorobutanone-2 which, as is known, is a very reactive chloroketone which can be employed for a number of organic synthesis.

It is the object of the present invention to provide measures to increase the proportion of 3-chlorobutanone-2 produced in the oxidation of n-butylenes and to separate the crude mixture of ketones produced.

1-butene is an especially reactive starting material but 2-butene or mixtures of these isomers can be employed. The technical n-butylene containing mixtures are also suited as starting materials.

The conversion of the n-butylenes with the aqueous catalyst solution is carried out under conditions which insure an intimate mixture and fine subdivision of both phases. Suitable reactors, for example, are bubble towers, spray towers, stirring vessels and tube systems through which the reacting phases flow with high velocity. In order to improve the mixing effect achieved such reactors may also be provided with stationary or movable installations, such as, for example, baffle surfaces, filling bodies, intensive stirrers and oscillatory plate systems. The parts which come into contact with the aqueous catalyst solution must be corrosion resistant. Suitable materials therefor, for instance, are titanium, tantalum, rubber, synthetic resins and ceramics.

In the reaction of the n-butylenes with the catalyst solution the cupric chloride contained therein is reduced to cuprous chloride. In order to maintain the catalytic activity of the solution it must be oxidized with oxygen. The oxygen required can be supplied to the catalyst solution together with the n-butylenes. It, however, is also possible to carry out the oxidation periodically after recovery of the ketones formed and in the absence of the n-butylenes. The oxygen employed can, for example, be in the form of air, air enriched in oxygen or pure oxygen. The oxidation of the catalyst solution can be carried out in the same type of reactors as are employed for the conversion of the n-butylenes.

The composition of the catalyst solution is material to the proportion of chlorobutanone produced. Solutions containing 0.6 to 0.9 mol copper per liter are favorable for the production of as pure a butanone as possible. Increasing the copper content increases the proportion of chlorobutanone produced. The upper limit which can be used practically is about 2 mol of copper per liter. The palladium content of the solution, which, for the production of butanone, should be between about 0.005 to 0.015 mol per liter for the production of butanone, can also be increased with increasing copper content. Quantities up to 0.05 mol per liter can be used. A further increase in palladium concentration is possible but produces no improvement worth mentioning.

The pH of the catalyst solution preferably should be below 3. As chloride ions are consumed in the production of chlorobutanone such ions must be replaced, preferably, by addition of hydrochloric acid. The addition of the hydrochloric acid can be effected periodically or continuously. The proportion of chlorobutanone produced is furthermore decidedly influenced by the reaction temperature employed. Temperatures between 95 and 105° C. are especially suited for the production of pure butanone. A rise in temperature produces a strong increase in the proportion of the chlorobutanone produced. The upper practically usable temperature limit is 180° C. The conversion expediently is carried out under superatmospheric pressure. It is especially advantageous to select a pressure at which the n-butylenes are liquid at the reaction temperature. Any substantial increase of pressure over the liquifaction pressure is uneconomical.

When the oxidation of the catalyst solution with oxygen or air is carried out separately from the reaction with the n-butylenes, elevated temperatures and pressures also are employed. Expedient ranges are between 100 and 180° C. and between 2 and 25 atmospheres.

The period of contact in the conversion of the n-butylenes should be between about 200 and 350 seconds in the production of pure butanone. Longer periods of contact lead to an increase in the proportion of chlorobutanone produced. Periods of contact up to about 1000 seconds are still economically feasible.

A further condition which is significant for the quantity of 3-chlorobutanone formed is the state of reduction of the catalyst solution, that is the ratio of Cu (II) to Cu (I).

The redox potential of the solution is a practical measure of this ratio. Such potential can be measured with a Pt electrode against a normal calomel electrode. The higher such potential of the catalyst solution the greater is the quantity of 3-chlorobutanone-2 produced. When oxygen is supplied to the catalyst solution simultaneously with the n-butylenes the potential can be increased by increasing the proportion of the oxygen supplied.

When the oxidation is carried out separately from the conversion of the n-butylene, a high potential may be maintained by interrupting the conversion of the butylene before reaching the lower limit which is set by the solubility of CuCl and reoxidizing the solution with oxygen. The potential and solubility of the CuCl depend upon the composition of the catalyst solution. As a criterion, however, a potential of 330 millivolts measured at 80° C., against the normal electrode can be considered as the lower limit and the lower limit of the solubility of CuCl is to be considered equal to a Cu (II):Cu (I) ratio of 1:1.

The reaction conditions are relative and overlap each other in practice in view of the coaction of all factors. It is, for example, possible, even with periods of contact of only 130 seconds, to obtain yields of about 10% by weight of 3-chlorobutanone-2, if catalyst solutions are employed which contain over 0.8 mol of copper per liter and the operating temperature is 120° C.

Catalyst solutions containing over 0.8 mol of copper per liter and reaction temperatures over 95° C. are practical for the production of 3-chlorobutanone-2 in addition to butanone.

The reaction products produced are separated from the catalyst solution by distillation. The pressure on the catalyst solution is decreased, preferably to normal pressure or slightly below, and the separation is completed with direct or indirect heating. For the production of pure butanone it is necessary to carry out the separation sufficiently far that the butanone content of the solution is reduced to about 20–40 mg. per liter.

A complete separation of the butanone is not necessary if an increased proportion of chlorobutanone is desired.

The crude ketones which are separated from the catalyst solution also contain by-products, such as, acetaldehyde, acetone, propionaldehyde, diacetyl, croton aldehyde, butyl alcohols, butyraldehyde and chlorination products. Butyraldehyde occurs in quantities of several percent, whereas the remaining by-products only occur in very slight quantities.

The crude ketones, if desired, after preheating and under reduced pressure, are introduced into a column. A butanone-water azeotropic mixture, together with the low boiling by-products, is withdrawn over the head of the column, whereas a mixture of chlorobutanone-water and higher boiling by-products is withdrawn from the lower end of the column. The chlorobutanone is separated from the water in a separator and purified by further distillation. The product withdrawn at the head which essentially consists of the azeotropic mixture of butanone and water is freed from the readily volatile components by degasification, from water by pressure distillation and then recovered completely pure by further distillation.

The following examples will serve to illustrate several embodiments of the invention. The butylene used in such examples was a technical mixture of 1-butene and 2-butene.

*Example 1*

A butylene oxygen mixture containing 24 vol. percent of $O_2$ was reacted at 6.5 atmospheres gauge pressure with an aqueous solution containing 140 g. $CuCl_2$ and 3 g. $PdCl_2$ per liter in a spray tower filled with Raschig rings. The reaction temperature was maintained between 94 and 101° C. The redox potential of the solution was 410 mv. The aqueous solution which remained in the tower for a period of 200 seconds was drawn off from the bottom of the tower, and its pressure decreased to 400 mm. Hg in a distillation column whereupon water and the crude ketones distilled off. The salt solution drawn off from the bottom of the column was pumped back to the spray tower after the water loss through vaporization had been compensated for. The crude ketones contained 13% by weight of 3-chlorobutanone-2.

*Example 2*

A butylene oxygen mixture containing 33 vol. percent of $O_2$ was reacted as in Example 1 with an aqueous solution containing 120 g. $CuCl_2$ and 5.4 g. $PdCl_2$ per liter and having a redox potential of 345–360 mv.

The crude ketones produced contained 6% by weight of 3-chlorobutanone-2.

*Example 3*

Butylene was reacted at 9 atmospheres gauge pressure in a spray tower with an aqueous solution containing 105 g. $CuCl_2$ and 4 g. $PdCl_2$ per liter. A reaction temperature of 94–98° C. was maintained. The aqueous solution remained in the tower for a period of 200 seconds and when drawn off had a redox potential of 345–360 mv. The pressure on the withdrawn solution was released to normal pressure in a distillation column, whereupon the crude ketones and water distilled off. The remaining salt solution which was drawn off from the bottom of the column, after the addition of make up water, was supplied to a second spray tower filled with air at 3 atmospheres gauge pressure and maintained at about 100° C. The oxidized solution which was drawn off from such second tower had a redox potential of 435 mv. and was recycled to the first tower.

The crude ketones produced contained 5.2% by weight of 3-chlorobutanone-2.

*Example 4*

Butylene was reacted at 6 atmospheres gauge pressure and at a temperature of 96–102° C. as described in Example 3 with an aqueous solution containing 150 g. $CuCl_2$ and 4.5 g. $PdCl_2$ per liter. The redox potential of such solution was 375 mv. after the reduction and 390 mv. after reoxidation.

The crude ketones produced contained 20% by weight of 3-chlorobutanone-2.

*Example 5*

Analogously to Example 3, butylene was reacted at 10 atmospheres gauge pressure at 104° C. with an aqueous solution containing 115 g. $CuCl_2$ and 1.8 g. $PdCl_2$ per liter. The period of contact of the solution with the butylene was 130 seconds and the redox potential of the solution after reduction was 340–350 mv. The removal of the crude ketones in the distillation column was such that only 1.2 g. of ketones remained in the aqueous solution.

The crude ketones produced contained 13% by weight of 3-chlorobutanone-2.

*Example 6*

310 liters of butylene and 220 liters of an aqueous salt solution were pumped through a reaction tube per hour at a velocity of 40 cm./sec. and at a temperature of 100–102° C. and under 16.5 atmospheres gauge pressure. The period of contact of the butylene with the aqueous solution in such reaction tube was 134 seconds. The aqueous solution contained 95 g. $CuCl_2$ and 1.7 g. $PdCl_2$ per liter and had a redox potential of 325–350 mv. After leaving the reaction tube, the aqueous solution was introduced into a distillation column where the pressure was released to atmospheric pressure. Upon such pressure release the crude ketones produced were distilled off leaving a residual ketone content of only 60–70 mg./liter in the aqueous solution. The crude ketones contained 2% by weight of 3-chlorobutanone-2. The aqueous solution was then reoxidized with air in a second reaction tube using the same temperature and pressure as was employed in the reaction with the butylene.

*Example 7*

Butylene was reacted as in Example 6 except that a temperature of 120° C. was used and that the aqueous solution contained 110 g. $CuCl_2$ and 2.3 g. $PdCl_2$. The redox potential of such solution after the reduction was 332–350 mv. The crude ketones produced contained 10% by weight of 3-chlorobutanone-2.

The crude ketone distillation product obtained upon release of the pressure was of the following composition:

|  | Percent by weight |
| --- | --- |
| Butanone | 22 |
| 3-chlorobutanone-2 | 2.5 |
| Butyraldehyde | 0.5 |
| Acetaldehyde, acetone, diacetyl | 0.1 |
| Water | 74.9 |

This mixture was heated to boiling at 730 mm. Hg pressure and supplied to a continuously operating column. A mixture of 85.7% butanone, 2% butyraldehyde, 0.3% acetaldehyde and acetone and 12% of water was withdrawn from the head of the column at 71.5° C. An almost butanone free mixture of chlorobutanone and water was withdrawn from the sump of the column at about 90° C. The mixture separated into two layers and the chlorobutanone layer was purified in two further distillation columns. The butanone containing distillate which was withdrawn from the head of the first column was supplied to a degasification column in which the acetaldehyde, acetone and butyraldehyde were separated off. The resulting butanone water azeotropic mixture which had been freed of low boiling components was then dehydrated in a pressure distillation at 5 atmospheres gauge pressure and then distilled in a further column at normal pressure to produce pure butanone.

Example 8

Butylene was reacted in a reaction tower at a temperature of 101° C. under 15.4–16.8 atmospheres gauge pressure with an aqueous solution containing 100 g. $CuCl_2$ and 2 g. $PdCl_2$ per liter. The period of contact of such aqueous solution with the butylene in such tower was adjusted to 420 seconds. The redox potential of the aqueous solution after reduction was 335–345 mv. The pressure release, distillation and reoxidation was carried out as in Example 6. The crude ketones produced contained 7% by weight of 3-chlorobutanone-2.

Example 9

Butylene was reacted in a reaction tower at a temperature of 115° C. under 17 atmospheres gauge pressure with an aqueous solution containing 142 g. $CuCl_2$ and 3 g. $PdCl_2$ per liter. The period of contact of such aqueous solution with the butylene in such tower was 320 seconds. The redox potential of the aqueous solution after reduction was 375–385 mv. The salt solution leaving the reaction tower was introduced into a distillation column where the pressure thereon was released and the crude ketones removed therefrom to a residual ketone content of only 1.2 g. per liter. The salt solution remaining was reoxidized as in Example 6 and recycled to the reaction tower. The crude ketones produced contained 70% by weight of 3-chlorobutanone-2.

Example 10

Butylene was reacted as in Example 9 but at a temperature of 140° C. and 20 atmospheres gauge pressure and using an aqueous solution containing 115 g. $CuCl_2$ and 3 g. $PdCl_2$ per liter. The redox potential of the solution after reduction was 390 mv. The crude ketones produced contained 52% by weight of 3-chlorobutanone-2.

Example 11

Butylene was reacted as in Example 10 but at a temperature of 103° C. and 17 atmospheres gauge pressure and using an aqueous solution containing 200 g. $CuCl_2$ and 7 g. $PdCl_2$ per liter. The redox potential of the solution after reduction was 380 mv. The crude ketones produced contained 40% by weight of 3-chlorobutanone-2.

We claim:

1. A process for the production of 3-chlorobutanone-2 in addition to butanone from a n-butylene, which comprises intimately contacting n-butylene at a temperature between 95 and 180° C. with an aqueous solution of copper chloride and palladium chloride containing 0.8 to 2 mols of copper and 0.005 to 0.05 mol of palladium per liter, the oxidation potential of said solution being maintained at a value over 330 millivolts measured at 80° C. against a normal calomel electrode by oxidation with oxygen, separating the crude ketones produced from such aqueous solution and separating the butanone from the 3-chlorobutanone-2 in the crude ketones by distillation.

2. The process of claim 1 in which the oxidation of said solution with oxygen is carried out periodically in the absence of n-butylene after removal of the crude ketones produced.

3. The process of claim 1 in which the oxidation of said solution with oxygen is carried out simultaneously with the contact of such solution with n-butylene.

4. The process of claim 1 in which said contact between n-butylene and the aqueous solution is at a pressure up to about 25 atmospheres at which the n-butylene is liquid.

References Cited in the file of this patent

FOREIGN PATENTS 1,207,594    France _____ Sept. 7, 1959

OTHER REFERENCES

Smidt et al.: Angewandte Chemie, vol. 71, No. 5, pp. 176–182 (1959).